US010731087B2

(12) United States Patent
Emigh et al.

(10) Patent No.: US 10,731,087 B2
(45) Date of Patent: Aug. 4, 2020

(54) USE OF POLYELECTROLYTES FOR THE REMEDIATION OF SOLIDS FROM OIL FIELD SEPARATION

(71) Applicant: Ecolab USA Inc., St. Paul, MN (US)

(72) Inventors: Chad Emigh, Bonnyville (CA); Corbin Ralph, Cold Lake (CA); Martin R. Godfrey, Eagan, MN (US); Thomas M. Miller, Aurora, IL (US); Timothy S. Keizer, Aurora, IL (US); Anthony G. Sommese, Wheaton, IL (US)

(73) Assignee: Ecolab USA Inc., St. Paul, MN (US)

( * ) Notice: Subject to any disclaimer, the term of this patent is extended or adjusted under 35 U.S.C. 154(b) by 372 days.

(21) Appl. No.: 15/446,614

(22) Filed: Mar. 1, 2017

(65) Prior Publication Data
US 2017/0253813 A1    Sep. 7, 2017

Related U.S. Application Data

(60) Provisional application No. 62/301,947, filed on Mar. 1, 2016.

(51) Int. Cl.
| *C10G 29/20* | (2006.01) |
| *C02F 11/14* | (2019.01) |
| *C02F 1/56* | (2006.01) |
| *B01D 21/01* | (2006.01) |
| *C02F 1/54* | (2006.01) |
| *C02F 103/32* | (2006.01) |

(Continued)

(52) U.S. Cl.
CPC ............. *C10G 29/20* (2013.01); *B01D 21/01* (2013.01); *C02F 1/542* (2013.01); *C02F 1/56* (2013.01); *C02F 11/14* (2013.01); *B01D 2221/08* (2013.01); *C02F 2001/007* (2013.01); *C02F 2101/32* (2013.01); *C02F 2103/10* (2013.01); *C02F 2201/008* (2013.01); *C10G 2300/1033* (2013.01); *C10G 2300/4068* (2013.01)

(58) Field of Classification Search
None
See application file for complete search history.

(56) References Cited

U.S. PATENT DOCUMENTS

| 4,536,286 A | 8/1985 | Nugent |
| 5,476,522 A * | 12/1995 | Kerr ................... B01D 21/01 |
| | | 210/734 |

(Continued)

OTHER PUBLICATIONS

International Search Report and Written Opinion relating to PCT Application No. PCT/US2017/020231 dated Jun. 6, 2017, 12 pages.

*Primary Examiner* — Clare M Perrin
(74) *Attorney, Agent, or Firm* — Stinson LLP

(57) ABSTRACT

The present invention generally relates to a method for separating solids from liquid in a slurry comprising solids and a liquid (e.g., an aqueous solution). More specifically, the method comprises contacting an effective amount of a high molecular weight polymeric flocculant with the slurry in a tanker truck or as the slurry is flowing to the truck, allowing the solids to settle during a settling time whereby the solids settle to the bottom of the tanker truck, and the liquid is removed from the tanker truck at a level above the settled solids. The high molecular weight polymeric flocculant can comprise repeat units derived from a cationic monomer, an anionic monomer, a nonionic monomer, or a combination thereof.

16 Claims, 1 Drawing Sheet

(51) Int. Cl.
*C02F 1/00* (2006.01)
*C02F 101/32* (2006.01)
*C02F 103/10* (2006.01)

(56) References Cited

U.S. PATENT DOCUMENTS

| | | | |
|---|---|---|---|
| 5,814,230 A | 9/1998 | Willis et al. | |
| 7,578,930 B2 | 8/2009 | Williamson et al. | |
| 2002/0139754 A1* | 10/2002 | Miller | B01D 21/01 210/726 |
| 2005/0161372 A1* | 7/2005 | Colic | B01D 17/047 208/391 |
| 2005/0194323 A1* | 9/2005 | Ruth | B01D 17/00 210/723 |
| 2009/0012765 A1* | 1/2009 | Raphael | E21B 43/00 703/10 |
| 2010/0243575 A1* | 9/2010 | Nowling | B01D 29/117 210/709 |
| 2011/0272362 A1* | 11/2011 | Sikes | C02F 1/56 210/705 |
| 2014/0116967 A1 | 5/2014 | Smith et al. | |
| 2015/0001161 A1* | 1/2015 | Wiemers | C02F 1/56 210/739 |

* cited by examiner

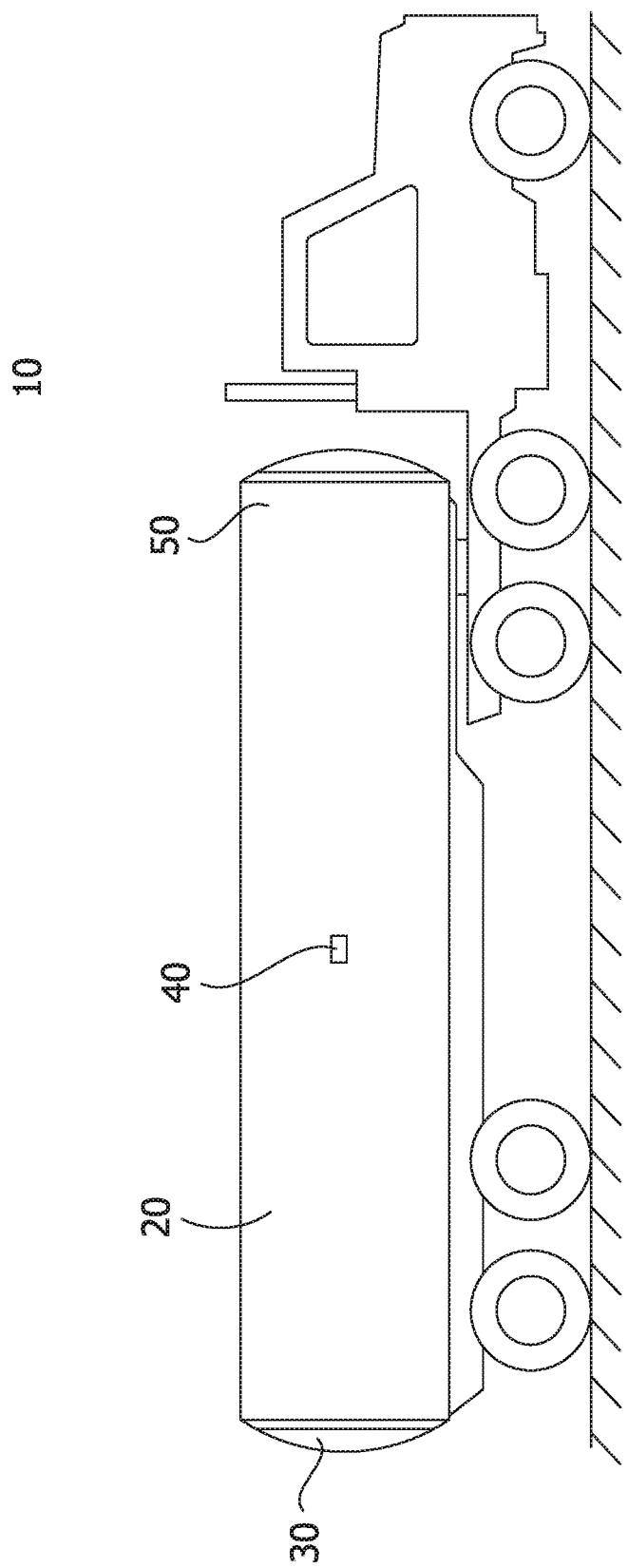

USE OF POLYELECTROLYTES FOR THE REMEDIATION OF SOLIDS FROM OIL FIELD SEPARATION

CROSS-REFERENCE TO RELATED APPLICATION

This application claims priority to U.S. Provisional Patent Application Ser. No. 62/301,947 filed on Mar. 1, 2016, the disclosure of which is incorporated herein by reference in its entirety.

FIELD OF THE INVENTION

The present invention generally relates to a process for separating solids from liquid in a slurry comprising solids and a liquid. The process comprises contacting an effective amount of a high molecular weight polymeric flocculant with the slurry in a tanker truck or as the slurry is flowing to the truck, allowing the solids to settle during a settling time. As a result, the solids settle to the bottom of the tanker truck, and the liquid is removed from the tanker truck at a level above the settled solids.

BACKGROUND OF THE INVENTION

A significant portion of oil produced in Canada is produced using a technique known as cold heavy oil production with sand (CHOPS). This technique allows sand inside the well bore in order to improve well production. Additionally, the technique utilizes a pumping device and residual pressure in the reservoir to lift the oil to the surface. As a result of the pumping device, oil coming to the surface is heavy, viscous, and contains a lot of water and sand. This oil and sand mixture is then separated at the surface.

It is common practice in the oil field to truck or pump oil into heated or ambient temperature holding tanks where the water, and solids, and sometimes oil separate from the mixture via gravity. Vacuum trucks are then employed to remove the oil and water/solids mixture that has settled at the bottom of the holding tank. During this process, the water and settled solids can become re-suspended and drawn into the awaiting truck. In order to re-settle the solids in the truck, operators pump supernatant water back into the tank and pump additional slurry into the truck to facilitate settling and maximize the amount of solids loaded.

This standard process is not time efficient since the operators need to wait for the solids to resettle before pumping the water back to the system. Further, a lot of space in the truck is taken up by water that displaces solids and reduces the amount of solids that can be transported per load to the remediation facility. This reduces the efficiency Therefore, a need exists to develop chemistries to separate solids from the liquid slurry.

SUMMARY OF THE INVENTION

One aspect of the invention is directed to a method for separating solids from a liquid in a slurry comprising oil, solids, and water comprising contacting an effective amount of a high molecular weight polymeric flocculant with a slurry in a tanker truck or as the slurry is flowing to the truck, allowing the solid solids to settle during a settling time. As a result, the solids settle to the bottom of the tanker truck, and the liquid is removed from the tanker truck at a level above the settled solids.

Another aspect of the invention is directed to a high molecular weight polymeric flocculant that can comprise repeat units derived from a cationic monomer, an anionic monomer, a nonionic monomer, or a combination thereof.

Other objects and features will be in part apparent and in part pointed out hereinafter.

BRIEF DESCRIPTION OF THE DRAWINGS

FIG. 1 is a schematic of a tank truck.

Corresponding reference characters indicate corresponding parts throughout the drawings.

DESCRIPTION OF THE PREFERRED EMBODIMENTS

There is a need for faster and more efficient separation of solids to produce a solids layer and a liquid layer. In particular, this method is used during cold heavy oil production with sand (CHOPS). CHOPS is typically used in unconsolidated sandstones that usually possess no true tensile strength arising from grain-to-grain mineral cementation. CHOPS produces oily sand, water, water-oil-clay emulsions. The solids produced are primarily sand. Waste management is a major cost factor for CHOPS operations and managing the waste, especially the solids, is important to reducing cost and improving the efficiency of the process. In order to manage the solids effectively, the aqueous solution produced must be clarified and separated from the solids in order to load more solids into a tanker truck for disposal. A larger rag layer (e.g., the solids are suspended in the aqueous solution) requires the tanker truck to carry more of the aqueous solution and less solids to the disposal site. Thus, the method described herein provides a faster and more efficient process for separating the solids from the aqueous solution so the aqueous solution can be removed from the tanker truck and more solids can be added.

The present invention is directed to a process of separating solids from liquid in a slurry comprising solids and a liquid, the process comprising contacting an effective amount of a high molecular weight polymeric flocculant with the slurry in a tanker truck or as the slurry is flowing to the truck, allowing the solids to settle during a settling time, whereby the solids settle to the bottom of the tanker truck, and the liquid is removed from the tanker truck at a level above the settled solids.

FIG. 1 shows a tanker truck 10 that, for example, can be used to transport the solids produced at a CHOPS site and transport the solids to a disposal site. The conventional tanker truck 10 has an inlet 50 for the slurry to be pumped into the tank 20 of the tanker truck 10. As the slurry is pumped through the inlet 10, an effective amount of a high molecular weight polymeric flocculant can be added to the slurry to aid the separation of the solids and the aqueous solution over an appropriate settling time. Once the settling time has passed, the aqueous solution can be removed through the liquid outlet 40 at a level that is above the settled solids. Once the aqueous liquid has been removed more slurry can be pumped into the tank 20 of the tanker truck 10 with the high molecular weight polymeric flocculant and the process can be repeated to increase the amount of the solids loaded into the tank 20 of the tanker truck 10. Once the operator has filled the tank with slurry through the inlet 50 and removed the aqueous solution through the outlet 40 for a set number of cycles, the tanker truck 10 can travel to the disposal site where the solids are removed through the tank door 30 and disposed of.

The liquid in the slurry can comprise an aqueous solution.

Further, the liquid in the slurry can comprise oil and an aqueous layer. Also, the liquid in the slurry can comprise an aqueous layer.

The slurry can be waste from a cold heavy oil production with sand (CHOPS) process.

The CHOPS process can be used in a hydrocarbon reservoir comprising unconsolidated sandstone.

The solids can comprise sand.

The tanker truck can be a vacuum truck. Also, the tanker truck can have a heated tank.

The settling time can be from about 2 minutes to about 20 minutes, from about 2 minutes to about 18 minutes, from about 2 minutes to about 15 minutes, from about 2 minutes to about 12 minutes, from about 2 minutes to about 10 minutes, from about 3 minutes to about 20 minutes, from about 3 minutes to about 18 minutes, from about 3 minutes to about 15 minutes, from about 3 minutes to about 12 minutes, or from about 3 minutes to about 10 minutes.

The oil can comprise heavy oil, bitumen, bitumen froth, or a combination thereof.

The high molecular weight polymeric flocculant can comprise repeat units derived from a cationic monomer, an anionic monomer, a nonionic monomer, or a combination thereof.

The cationic monomer can comprise a salt or a quaternary salt of a dialkylaminoalkyl acrylate, a salt or a quaternary salt of a dialkylaminoalkyl methacrylate, a salt or a quaternary salt of a dialkylaminoalkylacrylamide, a salt or a quaternary salt of a dialkylaminoalkylmethacrylamide, a N,N-diallyldialkyl ammonium halide, or a combination thereof, or a combination thereof.

Preferably, the cationic monomer can comprise dimethylaminoethylacrylate methyl chloride quaternary salt (DMAEA.MCQ), dimethylaminoethylmethacrylate methyl chloride quaternary salt (DMAEM.MCQ), dimethylaminoethylacrylate hydrochloric acid salt, dimethylaminoethylacrylate sulfuric acid salt, dimethylaminoethyl acrylate benzyl chloride quaternary salt (DMAEA.BCQ) dimethylaminoethylacrylate methyl sulfate quaternary salt, dimethylaminopropyl acrylamide hydrochloric acid salt, dimethylaminopropyl acrylamide sulfuric acid salt, dimethylaminopropyl methacrylamide hydrochloric acid salt, dimethylaminopropyl methacrylamide sulfuric acid salt, methacrylamidopropyl trimethyl ammonium chloride, acrylamidopropyl trimethyl ammonium chloride, diallyldimethyl ammonium chloride (DADMAC), or a combination thereof.

More preferably, the cationic monomer can comprise dimethyl-aminoethyl-acrylate methyl chloride quaternary salt (DMAEA-MCQ), dimethyl-aminoethyl-methacrylate methyl chloride quaternary salt (DMAEM-MCQ), diallyl-dimethyl-ammonium chloride (DADMAC), or a combination thereof.

The high molecular weight polymeric flocculant can comprise repeat units derived from a reaction mixture comprising from about 1 wt. % to about 99 wt. % cationic monomer, from about 1 wt. % to about 80 wt. % cationic monomer, from about 1 wt. % to about 60 wt. % cationic monomer, from about 1 wt. % to about 50 wt. % cationic monomer, from about 1 wt. % to about 40 wt. % cationic monomer, from about 10 wt. % to about 99 wt. % cationic monomer, from about 10 wt. % to about 80 wt. % cationic monomer, from about 10 wt. % to about 60 wt. % cationic monomer, from about 10 wt. % to about 50 wt. % cationic monomer, from about 10 wt. % to about 40 wt. % cationic monomer, from about 20 wt. % to about 70 wt. % cationic monomer, from about 20 wt. % to about 50 wt. % cationic monomer, or from about 20 wt. % to about 40 wt. % cationic monomer, based on the total weight of the monomers.

The anionic monomer can comprise acrylic acid, methacrylic acid, maleic acid, itaconic acid, 2-propenoic acid, 2-methyl-2-propenoic acid, 2-acrylamido-2-methyl propane sulfonic acid, sulfopropyl acrylic acid, sulphomethylated acrylamide, allyl sulphonic acid, vinyl sulphonic acid, a quaternary salt of acrylic acid, a quaternary salt of methacrylic acid, acrylamidoglycolic acid, -allyloxy-2-hydroxy-1-propanesulfonic acid, dialkyl aminoethyl acrylate, styrene sulfonic acid, 2-acrylamido-2-methylpropane phosphonic acid, an acid or salt of these monomers, or a combination of these monomers.

Preferably, the anionic monomer can comprise acrylic acid or salt thereof, methacrylic acid or salt thereof, 2-acrylamido-2-methylpropane sulfonic acid or salt thereof, dialkyl aminoethyl acrylate, or a combination thereof. More preferably, the anionic monomer can comprise acrylic acid or a salt thereof.

The high molecular weight polymeric flocculant can comprise repeat units derived from a reaction mixture comprising from about 1 wt. % to about 99 wt. % anionic monomer, from about 1 wt. % to about 80 wt. % anionic monomer, from about 1 wt. % to about 60 wt. % anionic monomer, from about 1 wt. % to about 50 wt. % anionic monomer, from about 1 wt. % to about 40 wt. % anionic monomer, from about 10 wt. % to about 99 wt. % anionic monomer, from about 10 wt. % to about 80 wt. % anionic monomer, from about 10 wt. % to about 60 wt. % anionic monomer, from about 10 wt. % to about 50 wt. % anionic monomer, from about 10 wt. % to about 40 wt. % anionic monomer, from about 20 wt. % to about 70 wt. % anionic monomer, from about 20 wt. % to about 50 wt. % anionic monomer, or from about 20 wt. % to about 40 wt. % anionic monomer, based on the total weight of the monomers.

The high molecular weight polymeric flocculant can comprise repeat units derived from a reaction mixture comprising from about 1 wt. % to about 99 wt. % acrylic acid or acrylate, from about 1 wt. % to about 80 wt. % acrylic acid or acrylate, from about 1 wt. % to about 60 wt. % acrylic acid or acrylate, from about 1 wt. % to about 50 wt. % acrylic acid or acrylate, from about 1 wt. % to about 40 wt. % acrylic acid or acrylate, from about 10 wt. % to about 99 wt. % acrylic acid or acrylate, from about 10 wt. % to about 80 wt. % acrylic acid or acrylate, from about 10 wt. % to about 60 wt. % acrylic acid or acrylate, from about 10 wt. % to about 50 wt. % acrylic acid or acrylate, from about 10 wt. % to about 40 wt. % acrylic acid or acrylate, from about 20 wt. % to about 70 wt. % acrylic acid or acrylate, from about 20 wt. % to about 50 wt. % acrylic acid or acrylate, or from about 20 wt. % to about 40 wt. % acrylic acid or acrylate, based on the total weight of the monomers.

The nonionic monomer can comprise N-isopropylacrylamide, N,N-dimethylacrylamide, N,N-diethylacrylamide, dimethylaminopropyl acrylamide, dimethylaminopropyl methacrylamide, acryloylmorpholine, hydroxyethyl acrylate, hydroxypropyl acrylate, hydroxyethyl methacrylate, hydroxypropyl methacrylate, dimethylaminoethylacrylate (DMAEA), dimethylaminoethyl methacrylate (DMAEM), maleic anhydride, N-vinyl pyrrolidone, vinyl acetate, N-vinyl formamide, acrylamide, methacrylamide, N-methylacrylamide, methyl acrylate, methyl methacrylate, acrylonitrile, N-vinyl methylformamide, acrolein, N,N-diallylamine, or a combination thereof.

Preferably, the nonionic monomer can comprise acrylamide, methacrylamide, or a combination thereof. More preferably, the nonionic monomer can comprise acrylamide.

The high molecular weight polymeric flocculant can comprise repeat units derived from a reaction mixture comprising from about 1 wt. % to about 99 wt. % nonionic monomer, from about 1 wt. % to about 80 wt. % nonionic monomer, from about 1 wt. % to about 60 wt. % nonionic monomer, from about 10 wt. % to about 95 wt. % nonionic monomer, from about 10 wt. % to about 85 wt. % nonionic monomer, from about 10 wt. % to about 75 wt. % nonionic monomer, from about 10 wt. % to about 70 wt. % nonionic monomer, from about 25 wt. % to about 100 wt. % nonionic monomer, from about 25 wt. % to about 85 wt. % nonionic monomer, from about 25 wt. % to about 70 wt. % nonionic monomer, based on the total weight of the monomers.

The high molecular weight polymeric flocculant can comprise repeat units derived from a reaction mixture comprising from about 1 wt. % to about 99 wt. % acrylamide, from about 1 wt. % to about 80 wt. % acrylamide, from about 1 wt. % to about 60 wt. % acrylamide, from about 10 wt. % to about 95 wt. % acrylamide, from about 10 wt. % to about 85 wt. % acrylamide, from about 10 wt. % to about 75 wt. % acrylamide, from about 10 wt. % to about 70 wt. % acrylamide, from about 25 wt. % to about 100 wt. % acrylamide, from about 25 wt. % to about 85 wt. % acrylamide, from about 25 wt. % to about 70 wt. % acrylamide, based on the total weight of the monomers.

The high molecular weight polymeric flocculant can comprise repeat units derived from a reaction mixture containing an acrylamide monomer and an acrylic acid monomer and has a molar ratio from about 1:10 to about 10:1, from about 2:8 to about 8:2, from about 3:7 to about 7:3, from about 1:10 to about 1:1, or from about 2:8 to about 5:7 of acrylamide monomer to acrylic acid monomer.

The high molecular weight polymeric flocculant can comprise repeat units derived from a reaction mixture having a molar ratio of about 3:7 of acrylamide to acrylic acid.

The weight average molecular weight of the high molecular weight polymeric flocculant can be from about 5,000,000 Da to about 20,000,000 Da, from about 5,000,000 Da to about 19,000,000 Da, from about 5,000,000 Da to about 18,000,000 Da, from about 5,000,000 Da to about 17,000,000 Da, from about 5,000,000 Da to about 16,000,000 Da, from about 5,000,000 Da to about 10,000,000 Da, from about 5,000,000 Da to about 9,000,000 Da, from about 8,000,000 Da to about 20,000,000 Da, from about 8,000,000 Da to about 19,000,000 Da, from about 8,000,000 Da to about 18,000,000 Da, or from about 8,000,000 Da to about 16,000,000 Da. Preferably, the weight average molecular weight of the high molecular weight polymeric flocculant can be from about 8,000,000 Da to about 16,000,000 Da or from about 5,000,000 Da to about 10,000,000 Da.

The high molecular weight polymeric flocculant can be prepared by reaction of the nonionic monomer with either the cationic monomer or the anionic monomer typically in the presence of a polymerization initiator. The high molecular weight polymeric flocculants can be prepared using various polymerization techniques.

In particular, the high molecular weight polymeric flocculant can be prepared by an inverse emulsion polymerization method or a dispersion polymerization method.

Further, some of the high molecular weight polymeric flocculants are available commercially from Nalco, Inc. as Nalclear® 7763, Nalclear® 7768, Nalclear® 7767, Nalclear® 7878, Nalclear® 7744, Nalclear® 8182 PULV, Nalclear® 8173 PULV, Nalclear® 7757, Nalclear® 9901, Nalclear® 9602 PULV, Optimer® 7192 PLUS, Optimer® 7139 PLUS, Optimer® 719 PLUS, Ultimer® 7750, Ultimer® 7751, Ultimer® 7752, Ultimer® 1460, Ultimer® 1470, Core Shell® 71301, Core Shell® 71302, Core Shell® 71305, Core Shell® 9918, or Core Shell® 9909.

The high molecular weight polymeric flocculant can be contacted to the slurry at a rate of from about 600 mL/minute to about 1,000 mL/minute, from about 600 mL/minute to about 900 mL/minute, from about 600 mL/minute to about 800 mL/minute, from about 600 mL/minute to about 700 mL/minute, from about 700 mL/minute to about 1,000 mL/minute, from about 800 mL/minute to about 1,000 mL/minute, from about 900 mL/minute to about 1,000 mL/minute, from about 700 mL/minute to about 900 mL/minute, from about 800 mL/minute to about 900 mL/minute, or from about 700 mL/minute to about 800 mL/minute. The exact concentrations will vary according to the solids content, the density and the viscosity of the slurry. Thus, as these parameters vary, the concentration of the flocculant is varied.

The high molecular weight polymeric flocculant can be formulated with a coagulant.

The coagulant can comprise a condensation polymer of an amine and epichlorohydrin, an epichlorohydrin-dimethylamine polymer, a polydiallyldimethylammonium chloride, a diallyldimethylammonium chloride/acrylamide copolymer, a diallyldimethylammonium chloride/acrylic acid copolymer, a diallyldimethylammonium chloride/DMAEA.MCQ copolymer, an ethylene dichloride ammonia polymer, a melamine formaldehyde polymer, or a combination thereof.

The coagulant can be prepared using a variety of standard polymerization techniques and are commercially available from Nalco, Inc. under Nalco Product Nos. 8102, 8103, 8015, 8108, 8190, 603, 8131, 8186, 8185, 8187, 2490, or 8130.

The molecular weight of the coagulant can be from about 30,000 Da to about 2,000,000 Da, from about 50,000 Da to about 2,000,000 Da, from about 50,000 Da to about 1,500,000 Da, from about 50,000 Da to about 1,000,000 Da, from about 100,000 Da to about 2,000,000 Da, from about 100,000 Da to about 1,500,000 Da, or from about 100,000 Da to about 1,000,000 Da. The high molecular weight polymeric flocculant can be in a solution.

The high molecular weight polymeric flocculant solution can be prepared at a concentration from about 0.1 wt. % to about 20 wt. %, from about 0.1 wt. % to about 18 wt. %, from about 0.1 wt. % to about 16 wt. %, from about 0.1 wt. % to about 14 wt. %, from about 0.1 wt. % to about 12 wt. %, from about 0.1 wt. % to about 10 wt. %, from about 0.1 wt. % to about 9 wt. %, from about 0.1 wt. % to about 8 wt. %, from about 0.1 wt. % to about 7 wt. %, from about 0.1 wt. % to about 6 wt. %, or from about 0.1 wt. % to about 5 wt. % based on the total weight of the solution.

The high molecular weight polymeric flocculant can be packaged in a heated dispenser.

Having described the invention in detail, it will be apparent that modifications and variations are possible without departing from the scope of the invention defined in the appended claims.

EXAMPLES

The following non-limiting examples are provided to further illustrate the present invention.

Example 1: Preparation of Polymers

Polymers were prepared by polymerizing a monomer emulsion consisting of an aqueous mixture of acrylamide and acrylate.

Polymer A was prepared by polymerizing acrylamide and acrylate using an inverse emulsion polymerization technique is commercially available from Nalco Champion as Nalclear® 7744. Polymer B was prepared by polymerizing acrylamide and acrylate using a dispersion polymerization technique is commercially available from Nalco Champion as Nalclear® 7757. Polymer C was prepared by polymerizing acrylamide and acrylate using a dispersion polymerization technique is commercially available from Nalco Champion as Ultimer® 1460). Polymer D was prepared by polymerizing acrylamide and acrylate using a dispersion polymerization technique is commercially available from Nalco Champion as Ultimer® 1470. Polymer E was prepared by polymerizing acrylamide and acrylate using an inverse emulsion polymerization technique is commercially available from Nalco Champion as Nalclear® 7766.

Polymers A, B, C, and D were diluted with water to yield a solution comprising 1% or less of polymer prior to testing. Polymer E was inverted into a water phase by high shear mixing prior to testing.

Example 2: Flocculation Testing Methods

Polymers as set forth in Example 1 were tested for flocculation performance using various oil sands samples obtained from a test site in Alberta, Canada. An oil sands sample and deionized water were placed in a 4 oz. jar. A desired amount of polymer as described in Example 1 was added to the oil sands sample and shaken vigorously. The oil sands sample was allowed to settle for approximately 30 or 90 seconds. Following the settling time, photographs were taken, printed, and sludge levels were quantified.

Additionally, the oil sands can be dosed with another aliquot of the polymer of similar or different compositions, shaken, and allowed to settle.

Example 3: Flocculation Tests

Flocculation tests were performed as set forth in Example 2. Table 1 lists the testing parameters for tests utilizing one dose of polymer flocculant.

TABLE 1

Flocculation test parameters involving one dose of polymer.

| Sample # | Sample weight (g) | DI Water (mL) | Polymer ID | Polymer % conc. | Polymer Volume (mL) | Polymer # of shakes | Polymer Dosage (mg/kg) |
|---|---|---|---|---|---|---|---|
| 54 | 5.85 | 24 | A | 3.3 | 0.3 | 10 | 1692 |
| 55 | 5.94 | 24 | A | 3.3 | 0.6 | 10 | 3334 |
| 56 | 5.87 | 24 | A | 3.3 | 1 | 10 | 5622 |
| 57 | 5.85 | 24 | B | 1 | 0.2 | 10 | 342 |
| 58 | 5.87 | 24 | B | 1 | 0.5 | 10 | 851 |
| 59 | 5.84 | 24 | B | 1 | 0.8 | 10 | 1370 |
| 60 | 5.86 | 24 | C | 1 | 0.2 | 10 | 341 |
| 61 | 6.02 | 24 | C | 1 | 0.5 | 10 | 830 |
| 62 | 5.97 | 24 | C | 1 | 0.8 | 10 | 1340 |
| 63 | 6.04 | 24 | D | 1 | 0.5 | 10 | 828 |
| 64 | 5.91 | 24 | D | 1 | 1.5 | 10 | 2540 |
| 65 | 5.85 | 24 | E | 0.091 | 0.5 | 10 | 78 |
| 66 | 5.82 | 24 | E | 0.091 | 1 | 10 | 156 |
| 67 | 5.84 | 24 | A | 3.3 | 0.6 | 10 | 3389 |
| 68 | 5.9 | 24 | B | 1 | 0.2 | 10 | 339 |

Table 2 lists the quantification of oil sands settled following the method described in Table 1.

TABLE 2

Quantification of results for oil sands treated with one dose of polymer.

| Sample # | ID | Time (sec.) | Height Settled (%) | Supernatant clarity[a] |
|---|---|---|---|---|
| 54 | A | 30 | 38 | 3 |
| 55 | A | 30 | 46 | 4 |
| 56 | A | 30 | 33 | 3 |
| 54 | A | 90 | 31 | 3 |
| 55 | A | 90 | 38 | 4 |
| 56 | A | 90 | 28 | 3 |
| 57 | B | 30 | 39 | 4 |
| 58 | B | 30 | 36 | 4 |
| 59 | B | 30 | 33 | 3 |
| 57 | B | 90 | 33 | 4 |
| 58 | B | 90 | 35 | 4 |
| 59 | B | 90 | 33 | 4 |
| 65 | E | 30 | 36 | 4 |
| 66 | E | 30 | 35 | 5 |
| 67 | A | 30 | 35 | 4 |
| 68 | B | 30 | 35 | 4 |
| 65 | E | 30 | 36 | 4 |
| 65 | E | 90 | 33 | 4 |
| 66 | E | 90 | 31 | 5 |
| 67 | A | 90 | 33 | 4 |
| 68 | B | 90 | 31 | 4 |

[a] 1 = poor and 5 = clear

Table 3 lists the testing parameters for tests utilizing successive doses of polymer flocculant.

TABLE 3

Flocculation test parameters involving successive doses of polymer.

| Sample # | Sample weight (g) | DI Water (mL) | Polymer ID | Polymer % conc. | Polymer Volume (mL) | Polymer # of shakes | Polymer Dosage (mg/kg) |
|---|---|---|---|---|---|---|---|
| 73 | 20.19 | 80 | A | 1 | 0.4 | 10 | 198 |
| 73 | 20.19 | 80 | A | 1 | 0.8 | 10 | 396 |
| 73 | 20.19 | 80 | A | 1 | 1.2 | 10 | 594 |
| 73 | 20.19 | 80 | A | 1 | 1.6 | 10 | 792 |
| 74 | 20.33 | 80 | E | 0.05 | 0.5 | 10 | 12 |
| 74 | 20.33 | 80 | E | 0.05 | 1 | 10 | 25 |
| 74 | 20.33 | 80 | E | 0.05 | 1.5 | 10 | 37 |
| 74 | 20.33 | 80 | E | 0.05 | 2.0 | 10 | 49 |

Table 4 lists the quantification of oil sands settled following the method described in Table 3.

TABLE 4

Quantification results for oil sands treated with successive doses of polymer.

| Sample # | ID | Time (sec.) | Height Settled (%) | Supernatant clarity[a] |
|---|---|---|---|---|
| 73 | A | 90 | 22 | 2 |
| 73 | A | 90 | 32 | 2 |
| 73 | A | 90 | 35 | 4 |
| 73 | A | 90 | 37 | 5 |
| 74 | E | 90 | 33 | 2 |
| 74 | E | 90 | 34 | 3 |
| 74 | E | 90 | 37 | 5 |
| 74 | E | 90 | 38 | 5 |

[a] 1 = poor and 5 = clear

When introducing elements of the present invention or the preferred embodiments(s) thereof, the articles "a", "an", "the" and "said" are intended to mean that there are one or more of the elements. The terms "comprising", "including"

and "having" are intended to be inclusive and mean that there may be additional elements other than the listed elements.

In view of the above, it will be seen that the several objects of the invention are achieved and other advantageous results attained.

As various changes could be made in the above compositions and processes without departing from the scope of the invention, it is intended that all matter contained in the above description and shown in the accompanying drawing shall be interpreted as illustrative and not in a limiting sense.

What is claimed is:

1. A process of separating solids from liquid in a slurry comprising solids and a liquid, the process comprising contacting an effective amount for separating solids from liquid of a high molecular weight polymeric flocculant with the slurry in a tanker truck or as the slurry is flowing to the tanker truck, allowing the solids to settle during a settling time, whereby the solids settle to the bottom of the tanker truck, and the liquid is removed from the tanker truck at a level above the settled solids, wherein the liquid comprises oil and an aqueous solution, the slurry is waste from a cold heavy oil production with sand process, and the high molecular weight polymeric flocculant has a weight average molecular weight of between about 5,000,000 Da and about 20,000,000 Da.

2. The process of claim 1, wherein the cold heavy oil production with sand process was used in a hydrocarbon reservoir comprising unconsolidated sandstone.

3. The process of claim 2, wherein the solids comprise sand.

4. The process of claim 3, wherein the tanker truck is a vacuum truck.

5. The process of claim 4, wherein the tanker truck has a heated tank.

6. The process of claim 5 wherein the settling time is from 2 minutes to 20 minutes.

7. The process of claim 6 wherein the settling time is from 3 minutes to 10 minutes.

8. The process of claim 1, wherein the high molecular weight polymeric flocculant comprises repeat units derived from a cationic monomer, an anionic monomer, a nonionic monomer, or a combination thereof and the cationic monomer comprises a salt or a quaternary salt of a dialkylaminoalkyl acrylate, a salt or a quaternary salt of a dialkylaminoalkyl methacrylate, a salt or a quaternary salt of a dialkylaminoalkylacrylamide, a salt or a quaternary salt of a dialkylaminoalkylmethacrylamide, a N,N-diallyldialkyl ammonium halide, or a combination thereof.

9. The process of claim 8, wherein the cationic monomer comprises diallyldimethyl ammonium chloride (DADMAC).

10. The process of claim 1, wherein the high molecular weight polymeric flocculant comprises repeat units derived from a cationic monomer, an anionic monomer, a nonionic monomer, or a combination thereof and the anionic monomer comprises acrylic acid, methacrylic acid, maleic acid, itaconic acid, 2-propenoic acid, 2-methyl-2-propenoic acid, 2-acrylamido-2-methyl propane sulfonic acid, sulfopropyl acrylic acid, sulphomethylated acrylamide, allyl sulphonic acid, vinyl sulphonic acid, acrylamidoglycolic acid, 3-allyloxy-2-hydroxy-1-propanesulfonic acid, dialkyl aminoethyl acrylate, styrene sulfonic acid, 2-acrylamido-2-methylpropane phosphonic acid, an acid or salt thereof, or a combination thereof.

11. The process of claim 10, wherein the anionic monomer comprises acrylic acid.

12. The process of claim 1, wherein the high molecular weight polymeric flocculant comprises repeat units derived from a cationic monomer, an anionic monomer, a nonionic monomer, or a combination thereof and the nonionic monomer comprises N-isopropylacrylamide, N,N-dimethylacrylamide, N,N-diethylacrylamide, dimethylaminopropyl acrylamide, dimethylaminopropyl methacrylamide, acryloylmorpholine, hydroxyethyl acrylate, hydroxypropyl acrylate, hydroxyethyl methacrylate, hydroxypropyl methacrylate, dimethylaminoethylacrylate (DMAEA), dimethylaminoethyl methacrylate (DMAEM), maleic anhydride, N-vinyl pyrrolidone, vinyl acetate, N-vinyl formamide, acrylamide, methacrylamide, N-methylacrylamide, methyl acrylate, methyl methacrylate, acrylonitrile, N-vinyl methylformamide, acrolein, N,N-diallylamine, or a combination thereof.

13. The process of claim 12, wherein the nonionic monomer comprises acrylamide, methacrylamide, or a combination thereof.

14. The method of claim 1, wherein the high molecular weight polymeric flocculant comprises repeat units derived from a reaction mixture containing an acrylamide monomer and an acrylic acid monomer and has a molar ratio from about 1:10 to about 10:1 of acrylamide monomer to acrylic acid monomer.

15. The method of claim 14, wherein the high molecular weight polymeric flocculant is formulated with a coagulant.

16. The method of claim 1, wherein the weight average molecular weight of the high molecular weight polymeric flocculant is between about 8,000,000 Da and about 16,000,000 Da.

* * * * *